US010335960B2

(12) United States Patent
Tessier et al.

(10) Patent No.: US 10,335,960 B2
(45) Date of Patent: Jul. 2, 2019

(54) KEY FOR ACTUATING A PLURALITY OF HUMANOID ROBOT MECHANISMS

(71) Applicant: SOFTBANK ROBOTICS EUROPE, Paris (FR)

(72) Inventors: Ludovic Tessier, Paris (FR); Claude Fritsch, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 266 days.

(21) Appl. No.: 15/311,118

(22) PCT Filed: Jun. 2, 2015

(86) PCT No.: PCT/EP2015/062209
§ 371 (c)(1),
(2) Date: Nov. 14, 2016

(87) PCT Pub. No.: WO2015/185530
PCT Pub. Date: Dec. 10, 2015

(65) Prior Publication Data
US 2017/0072575 A1    Mar. 16, 2017

(30) Foreign Application Priority Data

Jun. 5, 2014  (FR) ..................................... 14 55094

(51) Int. Cl.
*G05B 15/00*  (2006.01)
*G05B 19/00*  (2006.01)
*B25J 19/00*  (2006.01)
*B25B 27/04*  (2006.01)

(52) U.S. Cl.
CPC ............... *B25J 19/00* (2013.01); *B25B 27/04* (2013.01)

(58) Field of Classification Search
CPC ................................ B25B 27/04; B25J 19/00
See application file for complete search history.

(56) References Cited

U.S. PATENT DOCUMENTS

| 6,275,141 B1 * | 8/2001 | Walter | B60R 25/2009 180/287 |
| 2006/0292963 A1 * | 12/2006 | Sun | A63H 3/28 446/268 |
| 2010/0065999 A1 | 3/2010 | Bereznicki et al. | |
| 2015/0143687 A1 * | 5/2015 | O'Connell | H01R 13/518 29/592.1 |

FOREIGN PATENT DOCUMENTS

| CN | 102 218 722 A | 10/2011 |
| EP | 0 176 204 A1 | 4/1986 |
| EP | 2 050 544 B1 | 8/2011 |
| JP | S62-56095 U | 4/1987 |
| JP | H06-28143 U | 4/1994 |
| JP | H06-167153 A | 6/1994 |
| JP | H07-260089 A | 10/1995 |
| WO | 99/29384 A1 | 6/1999 |

* cited by examiner

*Primary Examiner* — Harry Y Oh
(74) *Attorney, Agent, or Firm* — Baker & Hostetler LLP

(57) ABSTRACT

An equipment item comprising a key and a humanoid-type robot comprising several mechanisms that can be actuated from outside the robot, wherein each of the mechanisms comprises a connection interface into which the key can be inserted, the connection interface of each of the mechanisms being configured such that the insertion of the key actuates the mechanism. The key comprises two slender fingers inserted simultaneously into two longitudinal orifices.

16 Claims, 7 Drawing Sheets ized by the external appearance, the morphology or the movements. The humanoid robot generally comprises several motorized articulations capable of moving, by means of an electric motor, one limb relative to another. The most advanced humanoid robots thus comprise legs, arms or hands. They are capable of walking or of dancing in the manner of a human being. They are capable of manipulating, in their hands, objects of various forms. Another aim is to approximate the human by its behavior and its intelligence. The artificial intelligence of robots is increasingly successful, allowing an increasingly complex interaction with a human user.

KEY FOR ACTUATING A PLURALITY OF HUMANOID ROBOT MECHANISMS

CROSS-REFERENCE TO RELATED APPLICATIONS

This application is a National Stage of International patent application PCT/EP2015/062209, filed on Jun. 2, 2015, which claims priority to foreign French patent application No. FR 1455094, filed on Jun. 5, 2014, the disclosures of which are incorporated by reference in their entirety.

FIELD OF THE INVENTION

The invention relates to an equipment item formed by a robot comprising several mechanisms that can be actuated from outside the robot, and by a single key making it possible to actuate each of the mechanisms of the robot. The invention is of particular use for the maintenance and transportation of a humanoid-type robot.

BACKGROUND

Humanoid robotics seeks to combine, in one machine, the greatest number of human-being-like characteristics. The first aim is to approximate the human by the external appearance, the morphology or the movements. The humanoid robot generally comprises several motorized articulations capable of moving, by means of an electric motor, one limb relative to another. The most advanced humanoid robots thus comprise legs, arms or hands. They are capable of walking or of dancing in the manner of a human being. They are capable of manipulating, in their hands, objects of various forms. Another aim is to approximate the human by its behavior and its intelligence. The artificial intelligence of robots is increasingly successful, allowing an increasingly complex interaction with a human user.

There are many possible applications of humanoid robots. Applications in the industrial field have been envisaged, for example for accessing contaminated zones presenting a risk to people. Numerous applications in the health field are also envisaged, for example for attending people exhibiting a deficiency. Use by a wider public for domestic purposes is also envisaged.

The assumption of large-scale deployment intended for the widest public is generating new constraints, for example industrial constraints, regulatory constraints or constraints concerning dependability. The design of the most recent generations of robots now incorporates a set of constraints to meet emerging regulations. For example, the robot intended for the consumer must not present any safety risk, both in the case of normal operation and in the case of a failure. Maintenance operations have to be able to be performed, by an experienced operator or simply by a user. There is an aim to take into account post-sale-related constraints in the design of the robot, for example to allow easy diagnostics and simple and quick repairability. The robot must also be able to be transported, for example from its place of production to its place of operation, while withstanding mechanical or vibratory stresses without risk of damage.

SUMMARY OF THE INVENTION

To this end, the subject of the invention is an equipment item comprising a key and a humanoid-type robot comprising several mechanisms that can be actuated from outside the robot, characterized in that each of the mechanisms comprises a connection interface into which the key can be inserted, the connection interface of each of the mechanisms being configured such that the insertion of the key actuates the mechanism.

In a particular configuration of the equipment item:
the key comprises two slender fingers of axes substantially parallel to one another, and
the connection interface of each of the mechanisms comprises two tubular orifices of axes substantially parallel to one another, configured to allow the simultaneous insertion of the two fingers of the key into the two orifices to actuate the mechanism.

The fingers and the orifices are configured symmetrically such that each finger can be inserted into one or other of the two orifices.

Advantageously, one of the mechanisms is a removable outer shell held against the robot by a clip, the connection interface of the shell being configured such that the insertion of the fingers into the orifices displaces a deformable element of the clip, releasing the shell from the robot.

In a particular configuration of the equipment item:
the fingers of the key comprise, at their end, a bevel,
the clip comprises a lateral deformable element and an axial deformable element, and
the connection interface of the shell is configured such that the bevel of a finger displaces the lateral deformable element then the axial deformable element upon the insertion of the key into the connection interface.

Advantageously, one of the mechanisms is a motorized articulation comprising a brake configured to hold the articulation in position by spring effect, the connection interface of the articulation being configured such that the insertion of a finger into a tubular orifice displaces the brake by opposing the spring effect, releasing the holding of the articulation in position.

In a particular configuration of the equipment item:
the fingers of the key comprise, at their end, a bevel,
the brake comprises an inclined plane, and
the connection interface of the articulation is configured such that the bevel of a finger comes into contact with the inclined plane upon the insertion of the key into the connection interface, so as to return the force exerted along an axis of insertion of the key parallel to the axes of the orifices to an axis of displacement of the brake.

In a particular configuration of the equipment item:
the fingers of the key comprise a notch, and
the connection interface comprises a lug configured to cooperate with the notch of a finger when the key is inserted, so as to hold the key inserted into the connection interface in position up to a predetermined force threshold, the lug being deformable so as to release the notch from the lug when a removal force greater than the predetermined threshold is applied to the key.

Advantageously, a transverse section of the fingers and of the orifices is ovoid.

Advantageously, the fingers consist of an aluminum-based material.

Advantageously, the key comprises a central part linking the two fingers provided with an opening intended to facilitate the gripping of the key.

Advantageously, the central part of the key consists of a silicone-based material.

BRIEF DESCRIPTION OF THE DRAWINGS

The invention will be better understood and other advantages will become apparent on reading the detailed description of an embodiment given by way of example in the following figures.

For clarity, the same elements will bear the same references in the different figures.

DETAILED DESCRIPTION

Figure 1A:
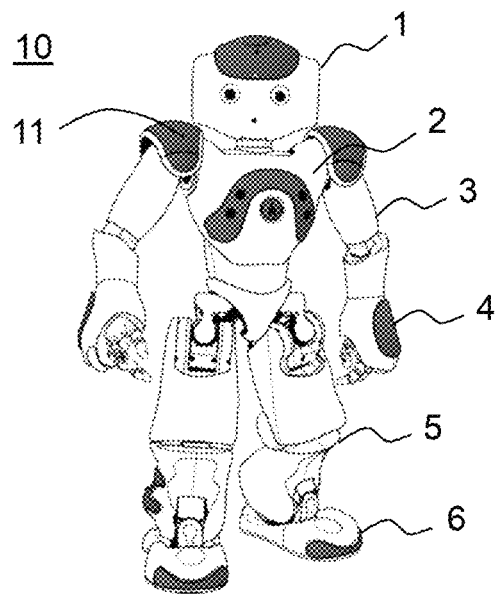
FIGS. 1a and 1b represent two examples of humanoid robots comprising several mechanisms that can be actuated by a key according to the invention.
Figure 1B:
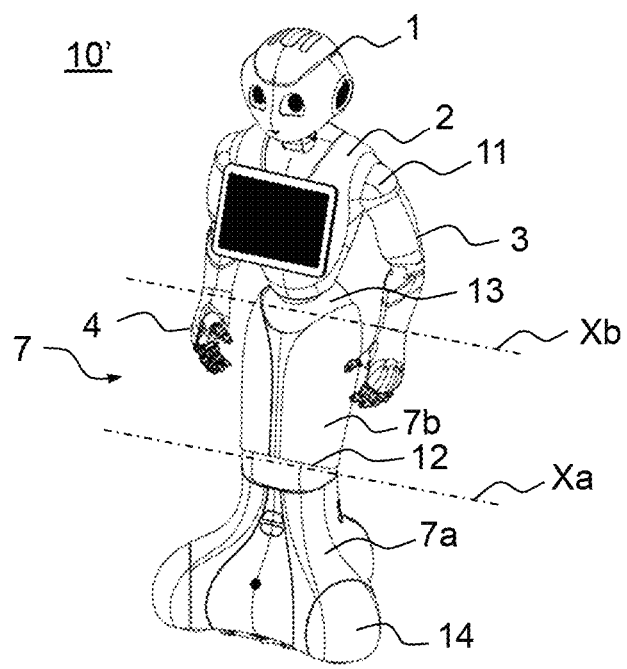

FIGS. 1a and 1b represent two examples of humanoid robots developed by the company Aldebaran Robotics™. The humanoid robot 10 represented in FIG. 1a comprises a head 1, a torso 2, two arms 3, two hands 4, two legs 5 and two feet 6. The humanoid robot 10' represented in FIG. 1b comprises a head 1, a torso 2, two arms 3, two hands 4 and a skirt 7. These two robots comprise several articulations allowing the relative movement of the different limbs of the robot in order to reproduce the human morphology and the movements thereof. The robots 10 and 10' comprise, for example, an articulation 11 between the torso 2 and each of the arms 3. The articulation 11 is motorized about two axes of rotation to make it possible to move the arm 3 relative to the torso 2 in the manner of the movements possible by a shoulder of a human being.

The humanoid robot 10 also comprises several articulations for moving the legs of the robot and reproducing the walking movement, in particular articulations that can be likened to a hip, between the torso and the thigh, to a knee, between the thigh and the leg, and to an ankle between the leg and the foot. Several forms of motorized articulations are implemented, moving one of the limbs around one or more degrees of freedom in rotation.

Figure 2A:
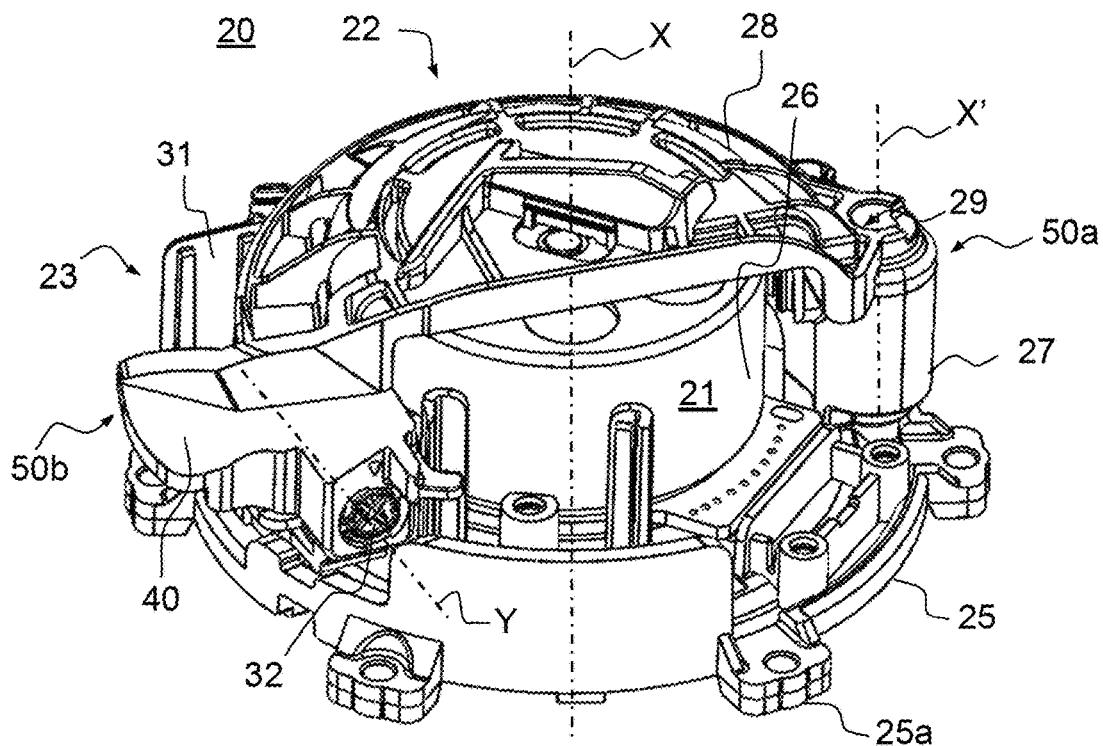
FIGS. 2a and 2b represent an example of a motorized articulation comprising a brake that can be released by a key according to the invention.
Figure 2B:
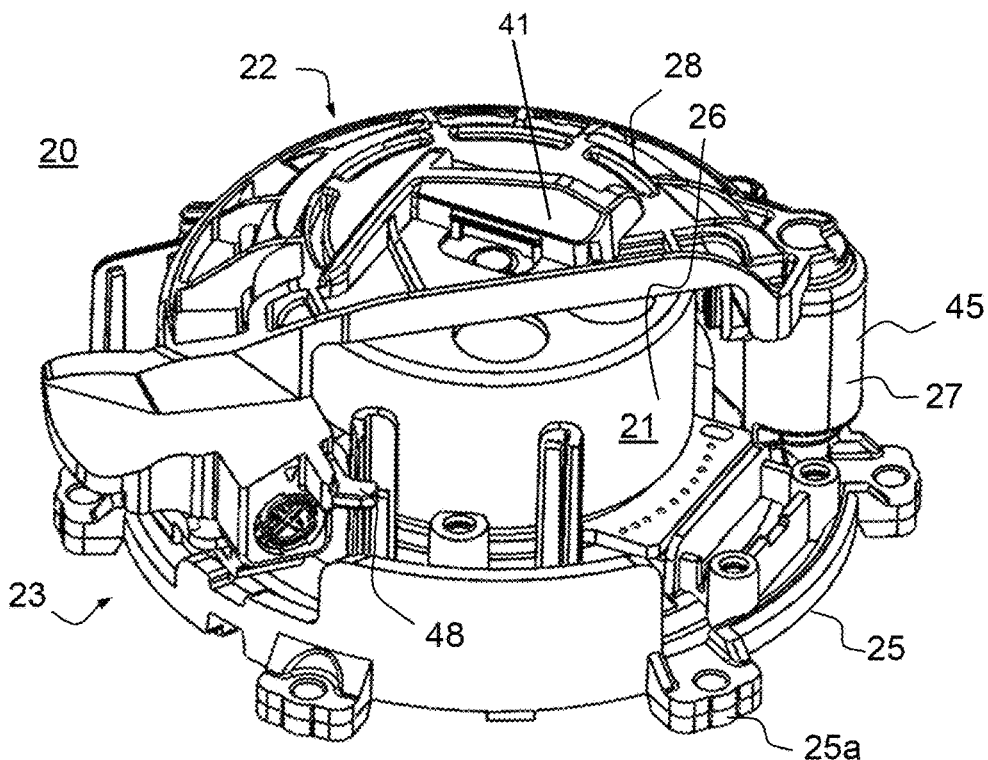

The humanoid robot 10' has a different architecture. To improve the stability and lower the center of gravity of the robot, the robot does not comprise any legs but a skirt 7 comprising, at its base, a tripod 14 capable of moving the robot around. The skirt also comprises a first articulation 12 like a knee, between a leg 7a and a thigh 7b. A second articulation 13 like a hip is mounted between the torso 2 and the thigh 7b. These two articulations 12 and 13 are pivot links motorized about an axis of rotation. The axis of rotation Xa of the articulation 12 and the axis of rotation Xb of the articulation 13 are substantially parallel to an axis linking the two shoulders of the robot, making it possible to tilt the robot forward or backward. FIGS. 2a and 2b describe in detail an example of a motorized articulation implemented in the humanoid robot 10'.

It should also be noted that the humanoid robot comprises a certain number of external parts giving the robot an aesthetic appearance. These parts can be fixed to the internal structure definitively or removably to allow access to various systems and mechanisms of the robot. The humanoid robot 10' comprises, for example, a removable outer shell in the rear part of the head 1 (not visible in FIG. 1b). The shell is held against the head and can be separated by a device of clip type.

The general idea of the present invention consists in implementing a single key to actuate several mechanisms of the humanoid robot. As described hereinbelow, using the key to mechanically lock or unlock an articulation of the robot, or even to unlock an outer shell and free an access to an internal part of the robot, is for example envisaged. The definition of the key and of the connection interfaces of the mechanisms actuated by the key are specific so as to limit the access to the mechanisms to the only holder of the key.

The invention is described hereinbelow for a humanoid robot of large size similar to the humanoid robot 10' comprising a removable outer shell and motorized articulations with a degree of freedom of pivot link type, that can be actuated by means of a single key. Obviously, the invention is not limited to the humanoid robots or to this type of actuatable mechanism. More generally, the invention relates to an equipment item consisting of a key and of a robot comprising several mechanisms that can be actuated from outside the robot, provided with a connection interface into which the key can be inserted, and configured such that the insertion of the key actuates the mechanism. The robot can be a humanoid-type robot or an animal-type robot, all covered by the general name of mobile robot. The invention is also applicable to an industrial robot.

FIGS. 2a and 2b represent, according to an example of a motorized articulation, respectively in a secured position and an operational position. The articulation 20 is intended to be mounted between a first and a second limbs not represented in the figures. The articulation 20 comprises:

a motor 21 capable of moving the second limb relative to the first limb, the motor comprising a fixed part intended to be linked to the first limb and a mobile part that can be moved relative to the fixed part and intended to be linked to the second limb, a brake 22 capable of exerting a force on the mobile part of the motor 21 by spring effect, to prevent the movement of the mobile part relative to the fixed part, an actuator 23 capable of displacing the brake 22 by opposing the spring effect, so as to release the mobile part of the motor 21 from the force of the brake and allow the motor 21 to move the mobile part relative to the fixed part.

The motor 21 is preferentially a rotary electric motor, comprising a motor baseplate 25 and a shaft that can be driven in rotation relative to the baseplate 25 about an axis X. The motor baseplate 25 forms the fixed part of the motor and comprises a base in disk form intended to be fixed to the first limb of the robot by means of six fixing tabs 25a distributed angularly about the base of the baseplate. The shaft (not visible in the figures) forms the mobile part of the motor and is secured to a motor bell housing 26 of substantially cylindrical form. The shaft passes through the motor baseplate and is intended to be linked to the second limb preferentially via a gear device (not represented). Thus configured, the electric motor 21 makes it possible to drive the shaft in rotation relative to the baseplate, driving the second limb in rotation relative to the first limb.

The articulation 20 also comprises the brake 22. In FIG. 2a, the articulation is represented in a secured position, in which the brake exerts a force on the mobile part of the motor to prevent the shaft from being driven in rotation. In FIG. 2b, the articulation is represented in an operational position, in which the brake is displaced so as to release the motor from the braking force and allow the shaft to be driven in rotation. In the secured position, the brake 22 exerts a force on the motor bell housing 21 preferentially consisting of a metal material, via a shoe preferentially consisting of an elastomer material, coming into contact with the cylindrical bell housing along a radial section thereof. The shoe exerts a force on the motor bell housing so as to prevent, by friction, the rotation of the shaft relative to the baseplate.

In the example represented, the brake 22 comprises a fixed arm 27 secured to the motor baseplate 25 and a mobile arm 28. The mobile arm 28 has a half-moon form between a first end 50a and a second end 50b, forming a semi-cover partially covering the motor bell housing. The mobile arm 28 is linked by the first end 50a to the fixed arm 27 by means of a pivot link 29 of axis X' substantially parallel to the axis X of rotation of the shaft. The shoe is fixed to an internal surface of the mobile arm, so as to come into contact with the radial surface of the bell housing 26, upon a rotation of the mobile arm about its axis X'. The shoe is fixed substantially equidistantly from the first and second ends 50a and 50b of the mobile arm 28. The brake 22 also comprises a spring mechanism, preferentially with a helical spring 45 wound about the axis X' and bearing on the fixed arm 27 and on the mobile arm 28 so as to exert a force tending to separate the mobile arm and the fixed arm. The force exerted by the spring between the mobile arm and the fixed arm is transmitted to the shoe in contact with the bell housing, making it possible to block the rotation of the shaft. By default, the rotation of the articulation is blocked.

The articulation also comprises an actuator 23 capable of displacing the brake by opposing the spring effect, so as to release the motor from the force of the brake and allow the motor to drive the shaft in rotation. In the example represented, a linear actuator (not represented) is mounted between the fixed arm 27 and the second end 50b of the mobile arm 28. The linear actuator comprises a rod that is translationally mobile between two positions along an axis Y, within a sheath. The sheath is fixed to a support 31 secured to the fixed arm 27. The rod has, at its end, a spherical form cooperating with a spherical imprint 32 formed in the mobile arm 28. The travel of the rod between its two positions defines the travel of the mobile arm between the secured position and the operational position. By default, for example when the articulation is not electrically powered, the rod is held by the effect of the spring in its most extended position. Conversely, when the articulation is powered, the actuator can be controlled to retract the rod into the sheath by exerting a force countering the spring effect. Various embodiments of the linear actuator can be envisaged, notably a linear actuator that can be driven by electromagnet.

The articulation also comprises means for manually displacing the brake to free the rotational movement of the two limbs. In particular, an inclined plane 40 is formed on the mobile arm, in proximity to its second end 50b, such that a tool displaced parallel to the axis X of rotation of the shaft, and against this inclined plane 40, can displace the mobile arm from the secured position to the operational position, by countering the spring effect. A second inclined plane 41 is also formed in proximity to the center of the half-moon form of the mobile arm. In practice, the motorized articulation represented in the figures is incorporated on the robot, in an outer jacket represented in FIGS. 1a and 1b giving the robot its outer aesthetic appearance.

It should also be noted that, while the following figures detail a particular example of an articulation motorized about two or three degrees of freedom, it is understood that the invention applies in principle to any type of articulation, for example an articulation with one, two or three degrees of freedom in rotation, or even an articulation with one or more degrees of freedom in translation.

Thus, the motorized articulation 20 is secured by providing the motor with a brake activated by default by means of a spring mechanism, and with means for releasing the motor from the grip of the brake by countering the force of the spring. The means for deactivating the brake mechanism comprise means that can be driven electronically, which is the role of the actuator, and manual means, which is the role of the inclined planes. Such a motorized articulation can notably be implemented for the articulations of the knee 12 and of the hip 13 of the humanoid robot 10' described in FIG. 1b.

Figure 3:
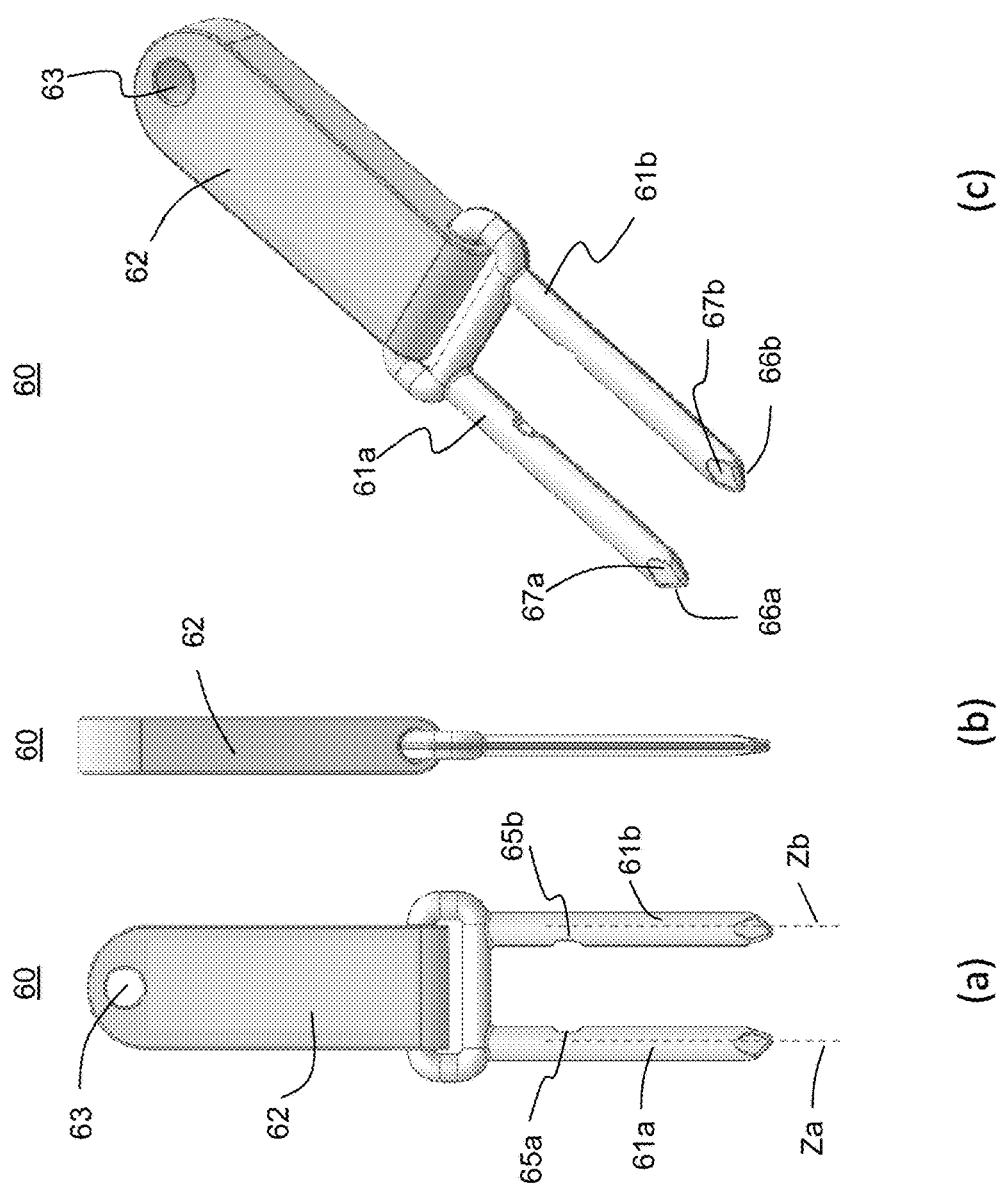
FIG. 3 represents, by three views, an example of a key according to the invention for a humanoid robot.

FIG. 3 represents, according to three views, an example of a key according to the invention for a humanoid robot. The key 60 comprises two slender fingers 61a and 61b linked by a central part 62. The two fingers 61a and 61b extend along two axes Za and Zb substantially parallel to one another. The central part 62 comprises an opening 63 formed at an end opposite the end supporting the two fingers 61a and 61b. The opening 63 is intended to facilitate the gripping of the key. The latter for example being able to be linked by a ring to a key ring in the manner of a key holder that is well known. In a preferred implementation of the invention, the fingers 61a and 61b consist of a material based on aluminum, and the central part 62 consists of a material based on silicone.

The transverse section of the fingers can be circular or preferentially ovoid. The fingers 61a and 61b are symmetrical to one another such that the key can independently be inserted in one direction or in the other. As will be detailed in the following figures, the two fingers of the key are intended to be inserted into two tubular orifices of the connection interfaces to actuate the mechanisms of the robot. For that, the separation between the axes of the tubular orifices is substantially equal to the separation between the axes Za and Zb of the fingers 61a and 61. Similarly, the transverse section of the tubular orifices is adapted to allow the insertion of each of the fingers of the key. In other words, the separation of the axes and the section—of the fingers and of the orifice—are configured so as to allow the insertion of the key, and act as a polarizer making it possible to prevent or at least limit the access to the mechanisms. The definition of the center-to-center distance and of the section is a simple and effective way of securing access to the mechanisms. The choice of a non-circular ovoid section notably makes it possible to prevent a user from actuating the mechanisms with a screwdriver of common design. Advantageously, the fingers and the orifices are configured symmetrically such that each finger can be inserted into one or other of two orifices.

Each of the two fingers 61a and 61b also comprises a notch, respectively referenced 65a and 65b, formed in an upper longitudinal portion, in proximity to the central part. The purpose of the notches 65a and 65b is to ensure that the key is held in position in the connection interface as is described hereinbelow.

Each of the fingers 61a and 61b also comprises, at its end, a lateral bevel, respectively referenced 66a and 66b, and a longitudinal bevel, respectively referenced 67a and 67b. The functions of these bevels will be detailed in the following figures.

Figure 4A:
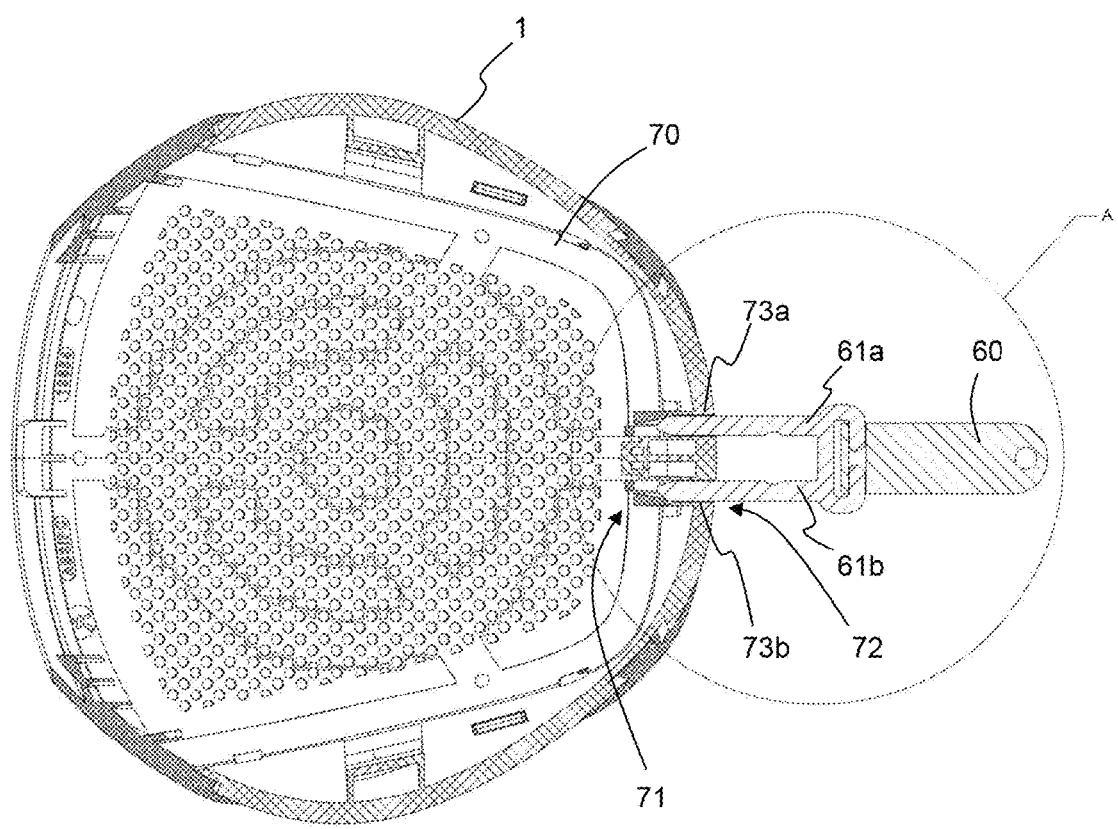
FIGS. 4a and 4b represent the key in a first implementation according to the invention, making it possible to release a removable outer shell mounted on a head of a humanoid robot.
Figure 4B:
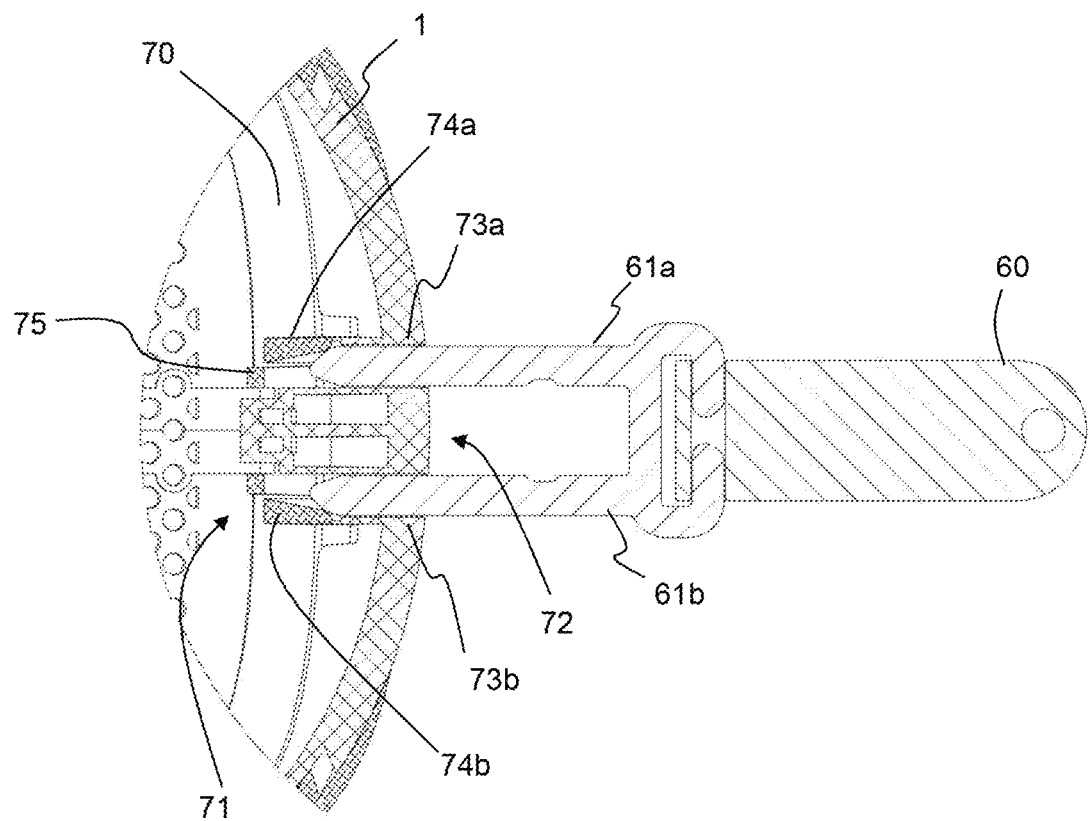

FIGS. 4a and 4b represent the key in a first implementation according to the invention, making it possible to release a removable outer shell mounted on a head of a humanoid robot. The head of the robot represented in cross section in FIG. 4a is similar to the head 1 of the robot described in FIG.

1b. The head comprises, in the rear part, a removable outer shell 70 held against the robot by removable fixing means 71 of clip type. In the clipped position, the shell is secured to the head; in the unclipped position, the shell frees the access to various functional devices. The head of the robot also comprises a connection interface 72 intended to allow the insertion of the key to actuate the mechanism, that is to say to unclip the shell and release it from the head of the robot. The connection interface 72 comprises two tubular orifices 73a and 73b of axes substantially parallel to one another. The section of the orifices and the separation between their axes are configured to allow the simultaneous insertion of the two fingers of the key. FIGS. 4a and 4b represent the situation in which the key 60 is partially inserted into the connection interface 72.

In a particular implementation of the invention, the clip 71 comprises two lateral deformable elements, respectively referenced 74a and 74b, positioned at least partially obstructing the tubular orifices, respectively 73a and 73b. The clip also comprises an axial deformable element 75 positioned so as to obstruct the end of each of the two tubular orifices. Upon the insertion of the key of the interface, the lateral bevels 66a and 66b of the fingers 61a and 61b come into contact with the lateral deformable elements 72a and 72b, the insertion force exerted by the operator displaces these lateral elements. The ends of the fingers then come into contact and displace the axial lateral element 75. The displacement by elastic deformation of the deformable elements of the clip makes it possible to release the removable shell. The clip is configured to displace the shell by a few millimeters. A manual intervention on the part of the operator then making it possible to remove the shell.

Figure 5:
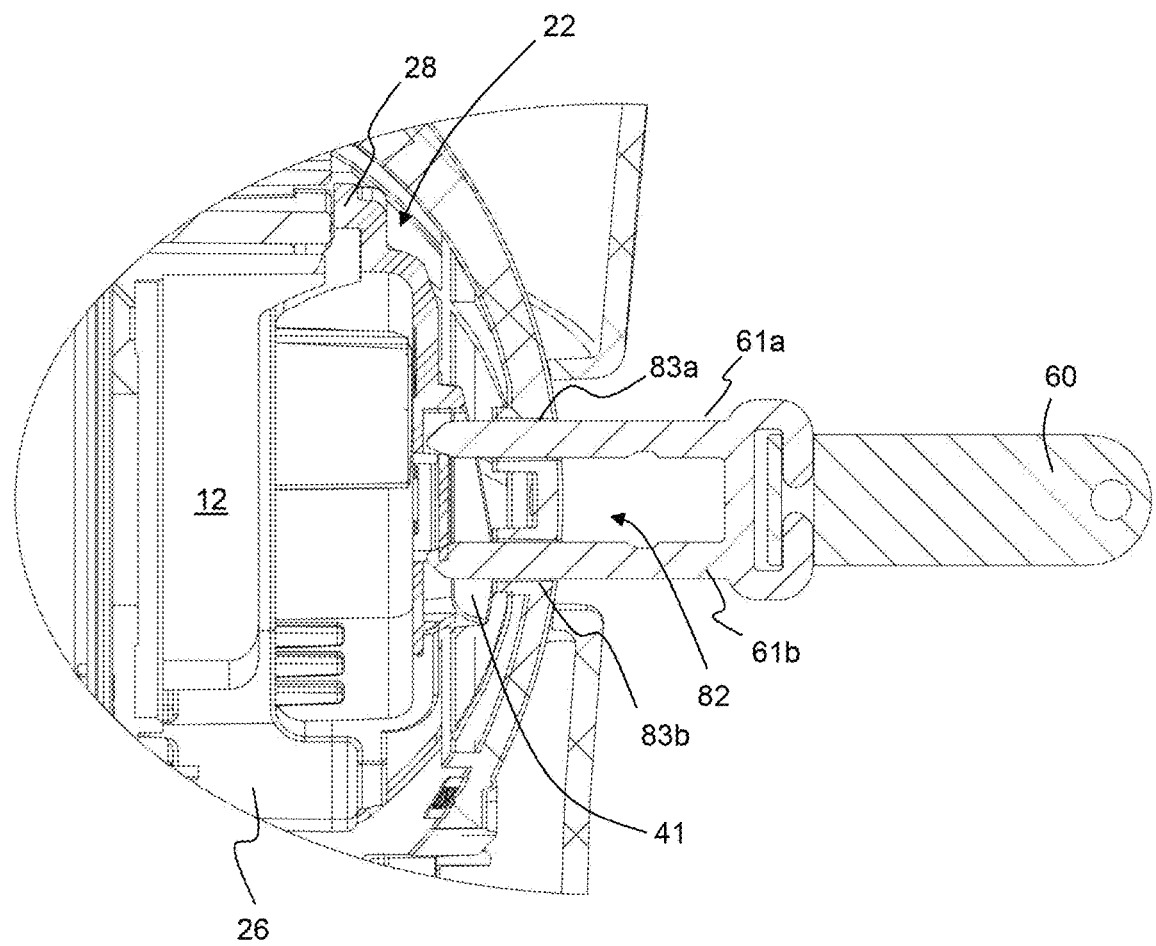
FIG. 5 represents the key in a second implementation according to the invention, making it possible to release the brake of a motorized articulation of a humanoid robot.

FIG. 5 represents the key in a second implementation according to the invention, making it possible to release the brake of a motorized articulation of a humanoid robot. FIG. 5 represents, in a cross-sectional view, a part of the articulation 12 of the humanoid robot 10' described in FIG. 1b. The articulation 12 implements a motorized articulation 20 similar to that described in FIGS. 2a and 2b. The articulation comprises a brake 22 formed by a fixed arm and a mobile arm 28 exerting a braking force on the motor bell housing 26 by means of a spring mechanism between the fixed arm and the mobile arm. An inclined plane 41 is formed on the mobile arm 28 as represented in FIG. 2b.

The articulation 12 comprises a connection interface 82 intended to allow the insertion of the key to release the articulation from the grip of the brake. As previously, the connection interface 82 comprises two tubular orifices 83a and 83b configured to allow the simultaneous insertion of the two fingers 61a and 61b of the key 60. The connection interface 82 is configured such that the inclined plane 41 at least partially obstructs one of the tubular orifices 83a and 83b when the articulation is in the secured position, that is to say when the brake is in contact with the motor bell housing. Upon the insertion of the key, at least one of the longitudinal bevels 67a and 67b of the fingers 61a and 61b comes into contact with the inclined plane 41. The insertion force exerted by the operator drives the displacement of the mobile arm by countering the return force of the spring. FIG. 5 represents the situation in which the key 60 is inserted into the connection interface 82, the articulation being released from the grip of the brake. Thus, the insertion of the key into the interface makes it possible to release the articulation so as to modify the relative orientation of the limbs. The limbs of the robot can be folded back, for example for a transportation or storage phase. In this second implementation, the connection interface is configured such that the axes of the tubular orifices are substantially parallel to the axis of rotation of the articulation. The inclined plane 41 and the longitudinal bevels make it possible to return the insertion force at right angles to the axis of rotation so as to displace the mobile arm of the brake. In other words, the connection interface of the articulation is configured such that the bevel of a finger comes into contact with the inclined plane upon the insertion of the key into the interface, so as to return the force exerted along an axis of insertion of the key parallel to the axes of the orifices toward an axis of displacement of the brake.

Figure 6:
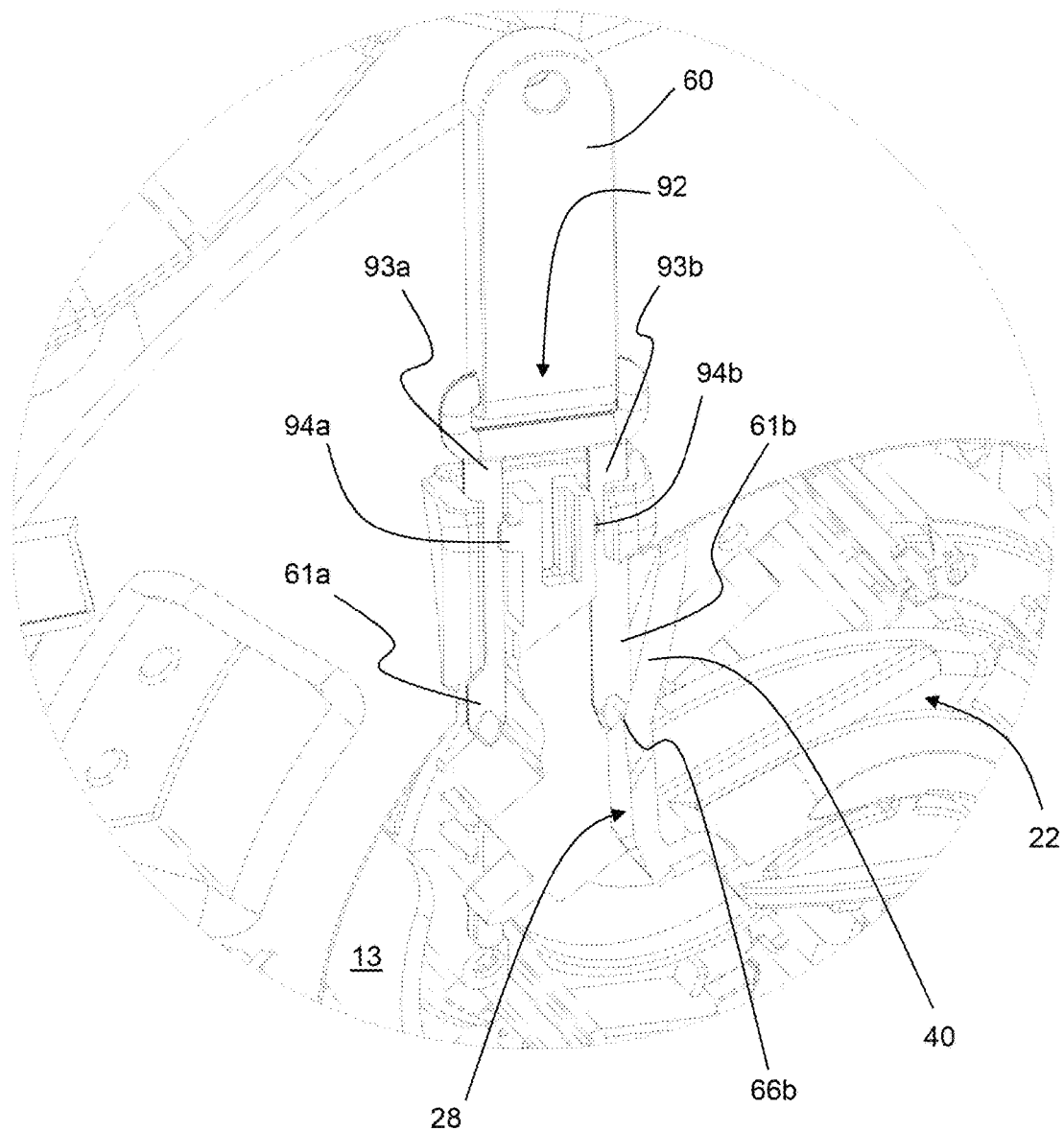
FIG. 6 represents the key in a third implementation according to the invention, making it possible to release the brake of a motorized articulation of a humanoid robot.

FIG. 6 represents the key in a third implementation according to the invention, making it possible to release the brake of a motorized articulation of a humanoid robot. FIG. 6 represents, in a cross-sectional view, a part of the articulation 13 of the humanoid robot 10' described in FIG. 1b. The articulation 13 implements a motorized articulation 20 similar to that described in FIGS. 2a and 2b. As previously, the articulation comprises a brake 22 formed by a fixed arm and a mobile arm 28 exerting a braking force on the motor bell housing 26 by means of a spring mechanism between the fixed arm and the mobile arm. A plane 40 is formed on the mobile arm 28 in proximity to its end 50b as represented in FIG. 2b.

The articulation 13 comprises a connection interface 92 intended to allow the insertion of the key to release the articulation from the grip of the brake. The connection interface 92 comprises two tubular orifices 93a and 93b, the center-to-center distance and the section of which are configured to allow the simultaneous insertion of the two fingers 61a and 61b of the key 60. The connection interface 92 is configured such that the brake plane 40 at least partially obstructs one of the tubular orifices 93a and 93b when the articulation is in the secured position, that is to say when the brake is in contact with the motor bell housing. Upon the insertion of the key, the lateral bevel 66b of the finger 61b comes into contact with the inclined plane 40. The insertion force exerted by the operator drives the displacement of the mobile arm 28 by countering the return force of the spring. FIG. 5 represents the situation in which the key 60 is inserted into the connection interface 92, the articulation being released from the grip of the brake. As previously, the insertion of the key into the interface makes it possible to release the articulation so as to modify the relative orientation of the limbs.

In this third implementation, the connection interface 92 also comprises two lugs 94a and 94b partially obstructing the tubular orifices 93a and 93b, and configured so as to cooperate with the notches 65a and 65b of the fingers 61a and 61b. Thus, the insertion of the key into the connection interface 92 pushes back the lugs by elastic deformation. The lateral bevels 66a and 66b of the fingers advantageously make it possible to facilitate the insertion of the fingers and the progressive displacement of the lugs. When the key is fully inserted, the lugs engage in the notches by reverting to their position, making it possible to hold the key in the inserted position. The removal of the key requires a more force to be exerted to deform the lugs. In other words, the connection interface is configured so as to hold the key inserted into the connection interface in position up to a predetermined force threshold, the lug being deformable so as to release the notch from the lug when a removal force greater than the predetermined threshold is applied to the key. This threshold can be determined by design of the notches and of the lugs, in particular by the choice of the materials and of the angles of the chamfers between lugs and notches.

The holding of the key in position makes it possible to keep the articulation rotationally mobile without the intervention of the operator. This functionality can notably be exploited in a phase of transportation of the robot. With the articulation being kept free to rotate, it can for example withstand significant vibratory stresses linked to the transportation.

The invention claimed is:

1. An equipment item comprising:
   a key comprising two slender fingers of axes substantially parallel one another, the fingers of the key comprise, at their end, a bevel;
   a humanoid-type robot comprising several mechanisms that can be actuated from outside the robot, one of the mechanisms is a removable outer shell, and
   a clip that is configured to hold the removable outer shell against the robot, the clip comprises a lateral deformable element and an axial deformable element, wherein
   each of the mechanisms comprises a connection interface into which the key can be inserted, the connection interface of each of the mechanisms being configured such that the insertion of the key actuates the mechanism, the connection interface of each of the mechanisms comprises two tubular orifices of axes substantially parallel to one another, configured to allow the simultaneous insertion of the two fingers of the key into the two orifices to actuate the mechanism,
   the fingers and the orifices being configured symmetrically such that each finger can be inserted into one or other of the two orifices, and
   the connection interface of the shell is configured such that upon the insertion of the key into the connection interface of the shell, the bevel of the fingers displaces the lateral deformable element then the axial deformable element of the clip, releasing the shell from the robot.

2. An equipment item comprising:
   a key comprising two slender fingers of axes substantially parallel to one another; and
   a humanoid-type robot comprising several mechanisms that can be actuated from outside the robot, wherein
   each of the mechanisms comprises a connection interface into which the key can be inserted, the connection interface of each of the mechanisms being configured such that the insertion of the key actuates the mechanism, the connection interface of each of the mechanisms comprises two tubular orifices of axes substantially parallel to one another, configured to allow the simultaneous insertion of the two fingers of the key into the two orifices to actuate the mechanism,
   the fingers and the orifices being configured symmetrically such that each finger can be inserted into one or other of the two orifices, and
   one of the mechanisms comprises a motorized articulation and a brake configured to hold the articulation in position by spring effect, the connection interface of the articulation being configured such that the insertion of a finger into a tubular orifice displaces the brake by opposing the spring effect, releasing the holding of the articulation in position.

3. The equipment item as claimed in claim 2, wherein:
   the fingers of the key comprise, at their end, a bevel,
   the brake comprises an inclined plane, and
   the connection interface of the articulation is configured such that the bevel of a finger comes into contact with the inclined plane upon the insertion of the key into the connection interface, so as to return the force inserted along an axis of insertion of the key parallel to the axes of the orifices to an axis of displacement of the brake.

4. An equipment item comprising:
   a key comprising two slender fingers of axes substantially parallel to one another, the fingers of the key comprise a notch, and
   a humanoid-type robot comprising several mechanisms that can be actuated from outside the robot, wherein
   each of the mechanisms comprises a connection interface into which the key can be inserted, the connection interface of each of the mechanisms being configured such that the insertion of the key actuates the mechanism, the connection interface of each of the mechanisms comprises two tubular orifices of axes substantially parallel to one another, configured to allow the simultaneous insertion of the two fingers of the key into the two orifices to actuate the mechanism,
   the fingers and the orifices being configured symmetrically such that each finger can be inserted into one or other of the two orifices, and
   at least one of the connection interfaces comprises a lug configured to cooperate with the notch of a finger when the key is inserted, so as to hold the key inserted into the at least one connection interface in position up to a predetermined force threshold, the lug being deformable so as to release the notch from the lug when a removal force greater than the predetermined threshold is applied to the key.

5. The equipment item as claimed in claim 1, wherein a transverse section of the fingers and of the orifices is ovoid.

6. The equipment item as claimed in claim 1, wherein the fingers consist of an aluminum-based material.

7. The equipment item as claimed in claim 1, wherein the key comprises a central part linking the two fingers provided with an opening intended to facilitate the gripping of the key.

8. The equipment item as claimed in claim 7, wherein the central part of the key consists of a silicone-based material.

9. The equipment item as claimed in claim 2, wherein a transverse section of the fingers and of the orifices is ovoid.

10. The equipment item as claimed in claim 2, wherein the fingers consist of an aluminum-based material.

11. The equipment item as claimed in claim 2, wherein the key comprises a central part linking the two fingers provided with an opening intended to facilitate the gripping of the key.

12. The equipment item as claimed in claim 11, wherein the central part of the key consists of a silicone-based material.

13. The equipment item as claimed in claim 4, wherein a transverse section of the fingers and of the orifices is ovoid.

14. The equipment item as claimed in claim 4, wherein the fingers consist of an aluminum-based material.

15. The equipment item as claimed in claim 4, wherein the key comprises a central part linking the two fingers provided with an opening intended to facilitate the gripping of the key.

16. The equipment item as claimed in claim 15 wherein the central part of the key consists of a silicone-based material.

* * * * *

UNITED STATES PATENT AND TRADEMARK OFFICE
CERTIFICATE OF CORRECTION

Page 1 of 1

PATENT NO.         : 10,335,960 B2
APPLICATION NO.    : 15/311118
DATED              : July 2, 2019
INVENTOR(S)        : Ludovic Tessier et al.

It is certified that error appears in the above-identified patent and that said Letters Patent is hereby corrected as shown below:

In the Claims

In Claim 1, Column 9, Line 11, "substantially parallel one another" should be --substantially parallel to one another--.

Signed and Sealed this
Third Day of September, 2019

Andrei Iancu
*Director of the United States Patent and Trademark Office*